Nov. 22, 1955                C. K. RAYNSFORD                2,724,268
ORIENTATION-ADJUSTMENT MEANS FOR A FLOWMETER
Filed April 21, 1952

INVENTOR.
CHARLES K. RAYNSFORD
BY
Mitchell & Bechert
ATTORNEYS

2,724,268

ORIENTATION-ADJUSTMENT MEANS FOR A FLOWMETER

Charles K. Raynsford, Summit, N. J., assignor to Vitro Corporation of America, New York, N. Y., a corporation of Delaware Application April 21, 1952, Serial No. 283,330

14 Claims. (Cl. 73—194)

My invention relates to magnetic-induction flowmeters of the type in which flow is measured by observing the voltage induced across the flow passage in the presence of a magnetic field.

Because of the extremely low voltages which must be detected in flowmeters of the character indicated, and because the electrode leads may, themselves, be coupled to the magnetic field so as to superpose spurious voltages on the flow voltage, it becomes important to reduce the lead-induced voltages to an absolute minimum. This may be done by rigidly mounting all the leads up to a point relatively close to the flow tube and by then bending one electrode lead with respect to another until the "no-flow voltage" is reduced to a minimum. This becomes a cumbersome and impractical procedure when the leads are as short as possible and when the mounting for the flow tube and the magnet itself assume substantial proportions.

It is, accordingly, an object of the invention to provide an improved flowmeter construction, permitting external access for manual adjustment of the relative orientation of electrode leads, that is, with respect to each other and with respect to the magnetic field.

It is a general object to meet the above object with a simple and fool-proof construction which need in no way impair the rigidity of the complete instrument, regardless of the extent of relative angular adjustment involved.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Briefly stated, my invention contemplates the employment of an adjustably rotatable member, journalled in the frame or fixed mounting means for the flow tube and carrying a lead-through to one of the electrodes by way of an off-center connection. Upon rotation of the rotatable means, the plane of the eccentrically-carried electrode lead is slightly shifted with respect to the magnetic lines in the flux gap, and a position of minimum or zero coupling may be found by observing electrode output under no-flow conditions. Suitable electronic means for processing signals derived from the electrodes are discussed in detail in copending patent application of A. R. Soffel, Serial No. 283,328, filed April 21, 1952.

In the present arrangements, the lead-throughs are supported by bushing means fitted in a bore in the frame. In one form to be described, the bushing means is a single rotatable member, and electrode leads are brought to two lead-throughs carried by the rotatable member. In the other form shown, the bushing means comprises two relatively rotatable elements, one of which is fixed; one electrode lead-through is carried by the fixed element and is, therefore, fixed against rotation, while the off-center lead-through is carried by the rotatable element and is therefore, angularly adjustable. In both cases, I show means whereby a ground-connection lead-through may be brought through the bushing means.

Figure 1:
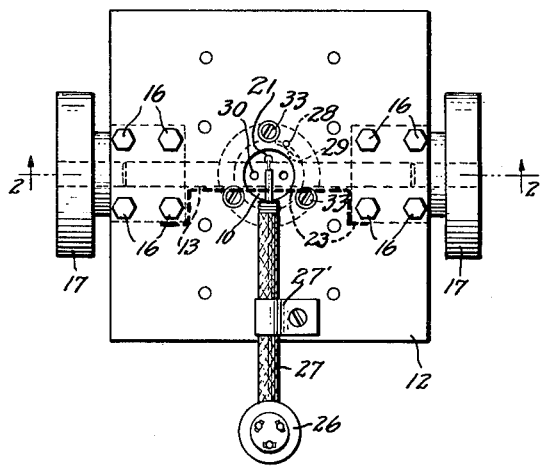
Fig. 1 is a plan view of the flowmeter sensing head incorporating features of the invention.
Figure 2:
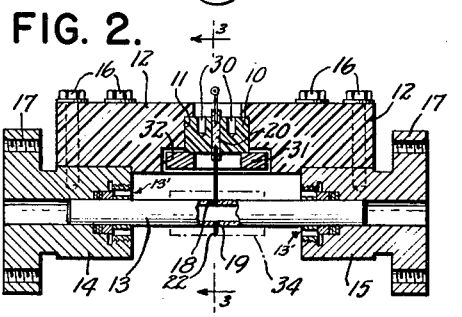
Fig. 2 is a sectional view in the plane 2—2 of Fig. 1.
Figure 3:
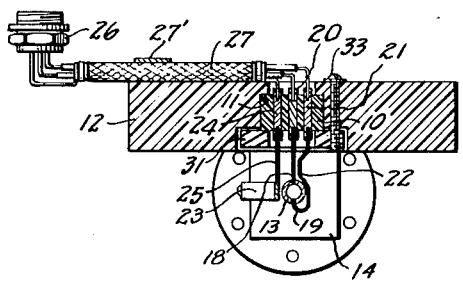
Fig. 3 is a sectional view in the plane 3—3 of Fig. 2.

In Figs. 1 to 3 of the drawings, my invention is shown in application to an electrode-lead orientation mechanism wherein all lead-throughs carried by the bushing means are rotatable as a unit on a single bushing 10, journalled for rotation in a bore 11, in a fixed mounting plate or member 12. The flow tube 13, is shown to be of insulating material, such as glass or plastic, and to be terminated by enlarged conductive adapter members 14—15 secured to the mounting member 12, as by bolts 16, and integrally formed with connecting means, such as conventional pipe flanges 17, for connection in a hydraulic circuit; packing-gland means 13' may secure and seal the tube 13 in the adapters 14—15. The flow tube may carry two electrodes 18—19 at a sensing section, and I prefer that the axis of the bore 11 (i. e., the adjusting axis) shall be generally aligned for intersection with, and preferably perpendicular to, the flow-tube axis at the sensing section. I have shown such alignment of this adjusting axis with electrode 18, for simplicity of construction.

Lead-throughs for the electrodes may be brought through the bushing means 10 by force-fitting conductive bars in a bushing 10 of insulating material. I have shown a central lead-through 20 for the electrode 18, so that there may be a direct axially aligned lead from the electrode 18 to the lead-through member 20. The other electrode lead-through 21 may be force-fitted into the bushing 10 eccentrically of the lead-through 20, and in Fig. 3 I show the employment of a flexible lead 22 connecting the electrode 19 to the lead-through 21.

It will be understood that although I refer to the lead 22 as being flexible, I prefer that the lead 22 shall be of relatively stiff material because the extent of desired angular adjustment will always be relatively small. It will also be appreciated from Fig. 3, that the electrode lead 22 should be as short as possible and should be formed relatively close to the periphery of the tube 19 and to the lead 21 so as to minimize the extent of such coupling to the magnetic field as may be attributable to the electrode-lead loop.

The flowmeter preferably includes grounding means for grounding upstream and downstream ends of the flow tube so as to minimize the induction of spurious signals attributable to longitudinal electric currents in the fluid in the tube. For this purpose, I have shown a ground strap 23 connecting the conductive adapter blocks 14—15 in the manner disclosed in greater detail in the copending patent application of Raynsford et al., Serial No. 283,329, filed April 21, 1952. As explained in said Raynsford et al. application, the ground strap is preferably tied electrically to the neutral point of the signal-processing amplifier; therefore, a lead-through should be provided for the ground strap 23 and substantially in the plane of the sensing section. I have provided a lead-through 24 in the bushing 10 for this purpose, and have located the lead-through 24 eccentrically of the adjustment axis and diametrically opposed to the lead-through 21. A flexible lead 25, having preferably the same properties as the lead 22, may connect the ground strap 23 to the lead-through 24.

Signals available in lead-throughs 20—21—24 may be brought to a connector member 26 through shielded-cable means 27, clamped at 27' to the mounting plate 12. I have shown the ground lead-through 24 connected to the shield of cable 27, and the lead-throughs 20—21 connected to the two conductors within the cable 27.

To facilitate adjustment, I provide separate means for releasably clamping the bushing 11 against rotation and for angularly adjusting the position of bushing 10, within the limits defined by the play of a key pin 28 in an angular slot 29 at the interfit of the bushing 10 with the bore 11 (see Fig. 1). The manual-adjustment means may simple comprise two externally facing spanner-access holes 30 on the upper face of the bushing 10, and the clamping means may comprise a ring 31 freely received in a counterbore 32 in the mounting plate 12 and radially overlapping the bottom edge of the bushing 10. The effective length of the bushing 10 should exceed that of the bore 11, so that, upon setting the clamping screws 33, the ring 31 will have ample clearance to set firmly against the bushing 10.

In use, there will ordinarily be but one occasion for employment of the orientation-adjustment means which has been described. The clamping screws 33 should first be relaxed to an extent permitting easy frictionally resisted rotation of the bushing 10. Upon angular adjustment of bushing 10 via spanner means 30, the plane of the electrode leads will be angularly oriented with respect to the lines of magnetic flux; one pole face of the magnet is suggested at 34 in Fig. 2. The angular adjustment should be continued until the no-flow signal attains a minimum, and the clamping means 33—31 may then be secured.

Figure 4:
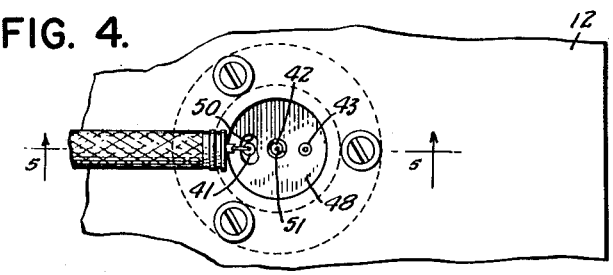
Fig. 4 is a fragmentary plan view of a modified construction.
Figure 6:
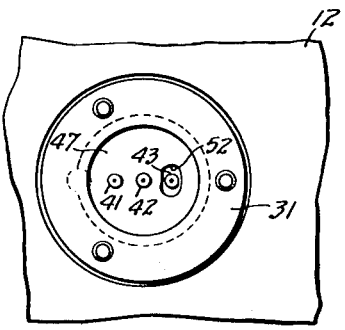
Fig. 6 is a bottom view of the device of Figs. 4 and 5.
Figure 5:
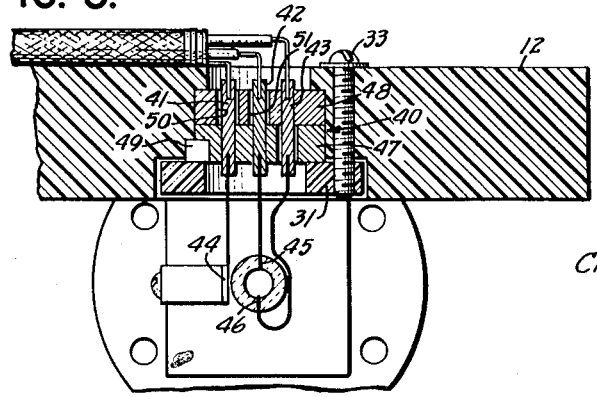
Fig. 5 is a sectional view in the plane 5—5 of Fig. 4.

In Figs. 4, 5, and 6, I show an alternative construction in which the desired relative angular adjustment of the electrode leads is effected by the actual movement of but one lead. For this purpose, the bushing means 40 which supports the lead-throughs 41—42—43, for the ground strap 44 and for the electrodes 45—46 respectively, comprises two bushings 47—48 which are relatively rotatable. Both bushings 47—48 may be received in the same counterbore 11 as was described in the embodiment of Figs. 1 to 3, and I have shown the lower bushing 47 to be fixed (as by key means 49) to the mounting plate 10, while the upper bushing 48 is rotatable as long as the clamping means 31—33 is relaxed sufficiently.

In accordance with a feature of the invention, the central lead-through 42, and preferably also the grounding lead-through 41, are fixedly carried and, therefore, rigidly supported on the bushing 47 which is held against rotation. The third lead-through 43 is affixed to the other bushing 48 and is shown connected to the remote electrode 46. Both bushings are shown formed with openings aligned with the respective lead-throughs, and the openings have a sufficient clearance with the lead-throughs to permit limited angular adjustment of the bushing 48, with respect to the bushing 47. Thus, an arcuate slotted opening 50, in the rotatable bushing 48, may accommodate the ground lead-through 41, and the bore 51 may constitute an enlarged opening to clear the central lead-through 42; an arcuate slot 52 in the lower bushing 47 may accommodate the lead-through 43. It will be clear that the above-described second form (Figs. 4–6) may lend itself just as readily to external access as the first form (Figs. 1–3), and that the electrode leads may be relatively oriented with minimum dislocation, such dislocation being limited to but one electrode lead.

It will be seen that I have described a relatively simple construction, not only providing convenience for the making of calibrated electrode-lead adjustment in a flowmeter, but also providing extreme ruggedness and, therefore, ability to hold an adjustment, once made. My adjustments entail no sacrifice in shortness of lead connections, and in fact, permit the utilization of shorter lead connections than heretofore for the very reason that it is not necessary to gain manual access to the leads.

While I have described my invention in detail for the preferred forms illustrated, it will be understood that modifications may be made within the scope of the invention as defined in the claims which follow.

I claim:

1. In a flowmeter, a flow tube, a pair of electrodes supported by said flow tube at a sensing section, fixed mounting means for said flow tube and having a bore on an axis aligned with one of said electrodes, bushing means seated in said bore and including a rotatable element fixedly carrying an off-center lead-through electrically connected to the other of said electrodes by flexible means, said bushing means further including a second lead-through aligned with and electrically connected to said one electrode, said fixed mounting means having a counter-bore on the axis of said bore, and a clamping ring seated in said counterbore and overlapping said bushing to clamp the same against rotation.

2. A flowmeter according to claim 1, and including key means cooperating in an angular slot at the interfit of said rotatable element with said bore to limit the extent of angular adjustment of said rotatable element.

3. In a flowmeter, a flow tube including a pair of sensing electrodes carried thereby at a sensing section, grounding means for said flow tube and including a lead connection substantially at said sensing section, rigid mounting means for said flow tube, said rigid mounting means having a bore therein on an axis generally perpendicular to the flow-tube axis at the sensing section, and insulated lead-through means seated in said bore and comprising two bushings seated in said bore, three lead-throughs carried by said bushings and connected respectively to said electrodes and to said ground connection, one of said lead-throughs being fixedly carried by one of said bushings off the axis of said bore, a second of said lead-throughs being fixedly carried by the other of said bushings off the axis of said bore, and the third of said lead-throughs being on the axis of said bore, each bushing having an opening aligned with the lead-through fixedly carried by the other bushing and of such clearance size as to accommodate relative angular displacements of said bushings.

4. A flowmeter according to claim 3, in which one of said bushings is fixed against rotation.

5. In a flowmeter, a flow tube, two opposed insulated electrodes carried by said tube and having leads brought into substantially parallel relation substantially on one side and externally of said tube, rigid mounting means for said tube, and rotatable means journalled in said rigid mounting means for rotation generally about an axis alined with one of said electrode leads, said rotatable means including a central lead-through connected to said one electrode lead, and an off-center lead-through carried by said rotatable means in insulated relation with said central lead-through and connected to the lead to said other electrode, whereby upon rotation of said rotatable means said off-center lead-through may be bodily displaced with respect to said central lead-through.

6. In a flowmeter, an elongated flow tube, two opposed electrodes in said tube at a probing section thereof, rigid mounting means for said flow tube, a rotatable member journalled in said rigid mounting means for rotation about an axis generally aligned for intersection perpendicular to the axis of said flow tube, two lead-throughs supported in spaced insulated relation generally in a diametral plane in said rotatable member, and flexible connections from said electrodes to the respective lead-throughs.

7. A flowmeter according to claim 6, in which said rotatable means carries a third lead-through spaced from said other lead-throughs and generally in said plane, two of said lead-throughs being on opposite sides of said axis of rotation in said diametral plane, and grounding means for said flow tube and including an electrical connection direct to said third lead-through.

8. In a flowmeter, a flow tube including a pair of sensing electrodes carried thereby at a sensing section, rigid mounting means for said flow tube, said rigid mounting means having a bore therein on an axis generally perpendicular to the flow-tube axis at the sensing section, and insulated electrode lead-through means seated in said bore and comprising bushing means of insulating material journalled for rotation in said bore, and a plurality of spaced lead-throughs carried by said bushing means and projecting from said bushing means toward said tube along axes substantially parallel to each other and to the axis of said bore, said electrodes being connected electrically to separate of said lead-throughs.

9. A flowmeter according to claim 8, in which said bushing means comprises a single bushing with two lead-throughs, one for each of said electrodes.

10. In a flowmeter, an elongated flow tube, two spaced electrodes supported by said tube on an electrode axis at a probing section, rigid mounting means for said flow tube, leads for said electrodes, one of said leads being flexible, and externally accessible means for adjusting the relative placement of said leads, comprising an adjustably rotatable member journalled in said fixed mounting means, a lead-through carried by said rotatable member off the center of rotation thereof and connected to said flexible lead, whereby rotational adjustment of said member will bodily displace said lead-through and flex said flexible lead with respect to said electrode axis, and friction means cooperating between said rotatable means and said fixed mounting means for retaining an adjusted position of said rotatable means.

11. A flowmeter according to claim 10, and including manual rotary-adjustment means carried by said rotatable member on the side thereof away from said flow tube.

12. A device according to claim 11, in which clamping means including externally accessible manual-adjustment means therefor are provided to bind said rotatable member against rotation.

13. In a flowmeter, an elongated flow tube, a pair of spaced electrodes supported by said flow tube on an electrode axis at a sensing section, fixed mounting means for said flow tube and having an opening near the axis of one of said electrodes, said mounting means including movable lead-through support means adjustably securable at said opening, said lead-through support means being movable in a radial plane with respect to said electrode axis, a first electrode lead-through supported by said fixed mounting means, an electrical connection from said lead-through to said one electrode on an axis generally aligned with said electrode axis, a second electrode lead-through carried by said lead-through support means and passing through said opening and including an electrical connection to the other of said electrodes, said second lead-through and the connection to said other electrode being radially offset from said electrode axis, whereby upon adjustment of said lead-through support means with respect to said electrode axis, said second lead-through may be bodily displaced with respect to said electrode axis.

14. In a flowmeter, an elongated flow tube, a pair of spaced electrodes supported by said flow tube at a sensing section, fixed mounting means for said flow tube and having an opening off the axis of one of said electrodes, said fixed mounting means including movable lead-through support means at said opening, said lead-through support means being movable generally in a radial plane with respect to said axis, adjustable securing means for securing a selected positioning of said support means at said opening, first electrode-lead means supported by said fixed mounting means and connected to said one electrode generally along said axis, and second electrode-lead means carried by said support means and passing through said opening at a location generally offset from said axis and connected to the other of said electrodes.

References Cited in the file of this patent

Transaction of the Royal Society of S. Africa, vol. 28, 1940, pp. 143–160, H. D. Einborn.

An Alternating Field Induction Flowmeter of High Sensitivity, A. Kolin, in Review of Scientific Instruments, vol. 16, No. 5, May 1945, pp. 109–116.

Electromagnetic Flowmeter for Transient Flow Studies, James S. Arnold, in Review of Scientific Instruments, vol. 22, No. 1, January 1951, pp. 43–47.

An Induction Flowmeter Design Suitable for Radioactive Liquids, by W. G. James, in Review of Scientific Instruments, vol. 22, No. 12, December 1951, pp. 989–1002.